United States Patent [19]
Herrera

[11] Patent Number: 6,116,700
[45] Date of Patent: Sep. 12, 2000

[54] LOCKABLE AUTOMOTIVE WHEEL WITH SPLINED ADAPTER

[76] Inventor: Juan C. Herrera, 1403 N. Baxter St., Anaheim, Calif. 92806

[21] Appl. No.: 09/185,229

[22] Filed: Nov. 3, 1998

[51] Int. Cl.⁷ ................................................ B60B 23/00
[52] U.S. Cl. ..................... 301/111; 301/114; 301/35.58; 70/225; 70/386
[58] Field of Search ................... 301/111, 105.1, 301/114, 35.55, 35.63, 35.88; 70/225, 237, 34, 386, 226

[56] References Cited

U.S. PATENT DOCUMENTS

| | | | |
|---|---|---|---|
| 2,046,779 | 7/1936 | Hack | 301/35.58 |
| 2,231,194 | 2/1941 | Peterson | 301/35.63 |
| 4,621,873 | 11/1986 | Weinstein et al. | 70/225 |
| 5,352,026 | 10/1994 | Snook | 301/105.1 |
| 5,492,391 | 2/1996 | Snook | 301/35.58 |
| 5,584,537 | 12/1996 | Miansian | 301/35.63 |
| 5,636,905 | 6/1997 | Pagacz | 301/35.58 |
| 5,820,224 | 10/1998 | Dimatteo, Jr. | 301/35.58 |
| 5,887,952 | 3/1999 | Gandellini | 301/35.63 |
| 5,934,118 | 8/1999 | Henness | 70/226 |
| 5,941,105 | 8/1999 | Macey | 70/225 |

*Primary Examiner*—S. Joseph Morano
*Assistant Examiner*—Long Bao Nguyen
*Attorney, Agent, or Firm*—Albert O. Cota

[57] ABSTRACT

A lockable automotive wheel which utilizes a splined hub adapter (44) attached to the lug studs of a motor vehicle. A hollow center hub (60) with mating internal splines (62) is disposed upon the adapter. A hub securing member (68) is screwed onto the adapter with a tapered interface (64) and (80) engaging the center hub. A keyed lock (88) or flat headed screw (90) is imbedded into an enclosure (82) within the hub securing member and one or two balls (106) are forced into a groove (46) in the adapter by rotation of flats (84) when the lock or optional screw is rotated by a key or special tool. The hub securing member is screwed on or off by a separate tool mating with the polygon shaped raised outside portion or struck with a blunt instrument in the extending arm embodiment. The splined hub adapter remains attached to the vehicle after the wheel is removed. The wheel may be the spoked type or solid with the center hub integral with the outer rim (40).

15 Claims, 3 Drawing Sheets

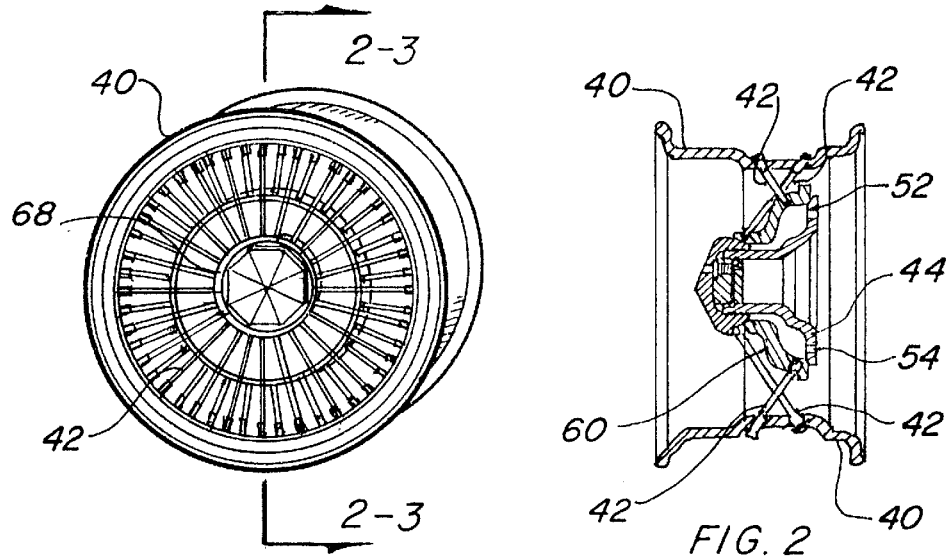
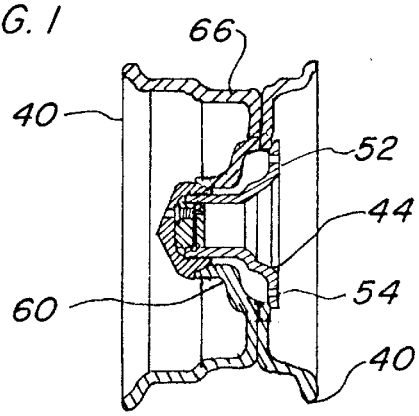
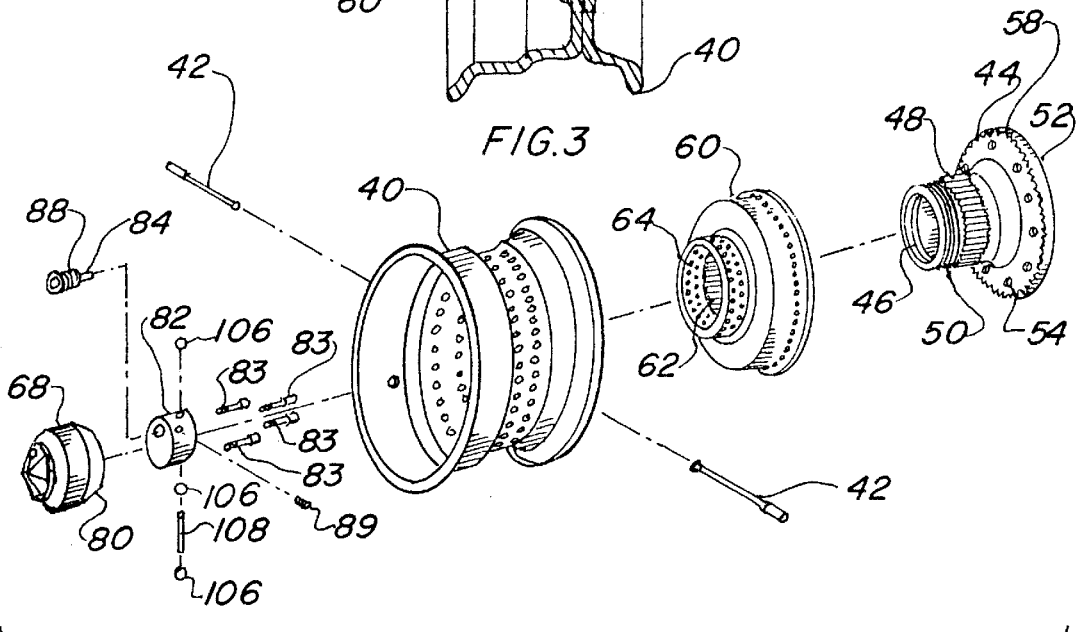

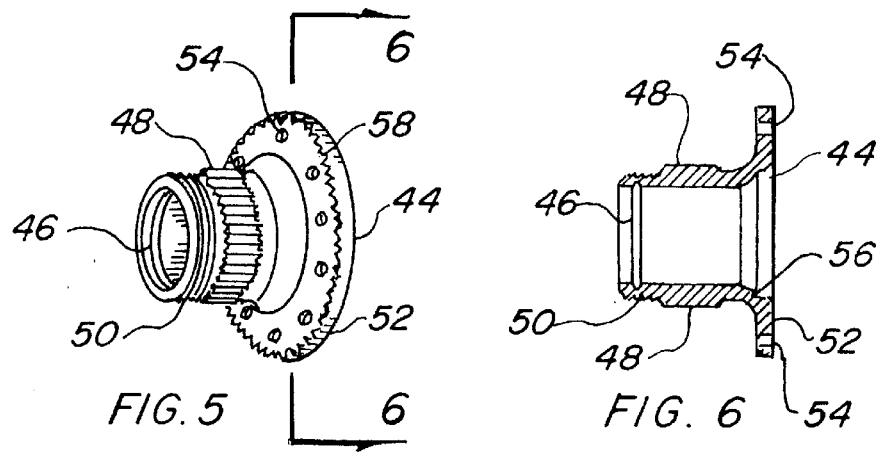
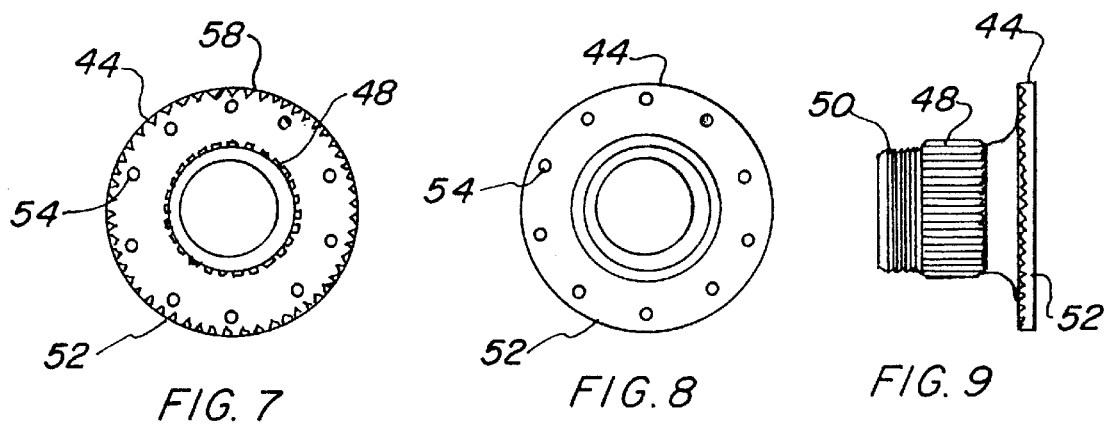
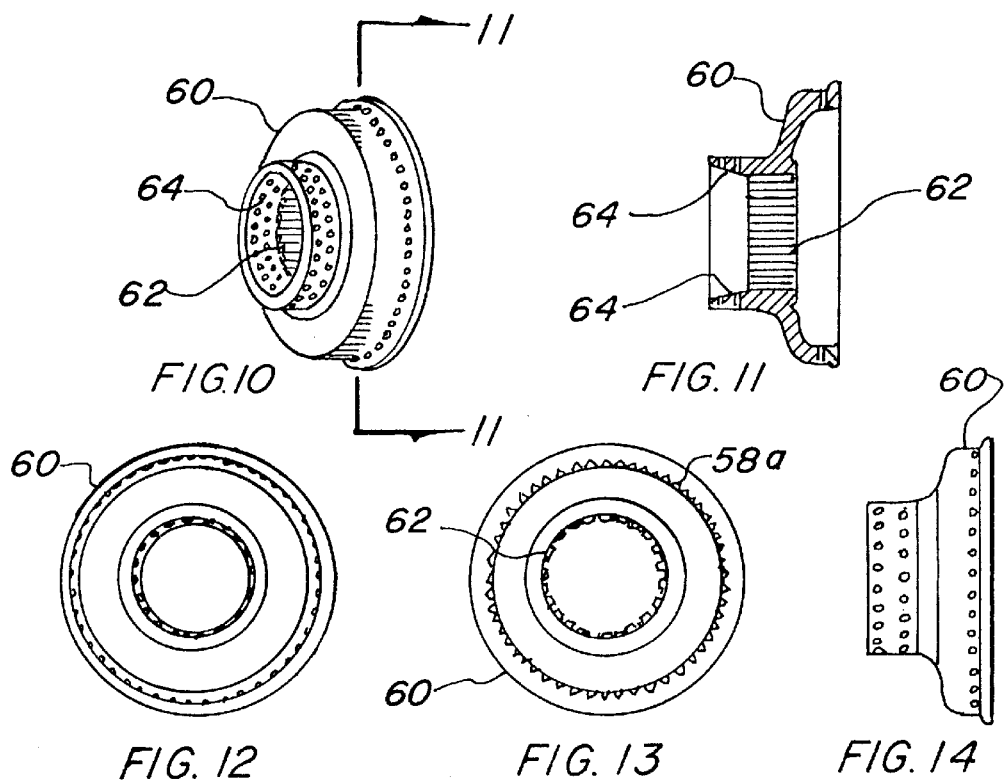

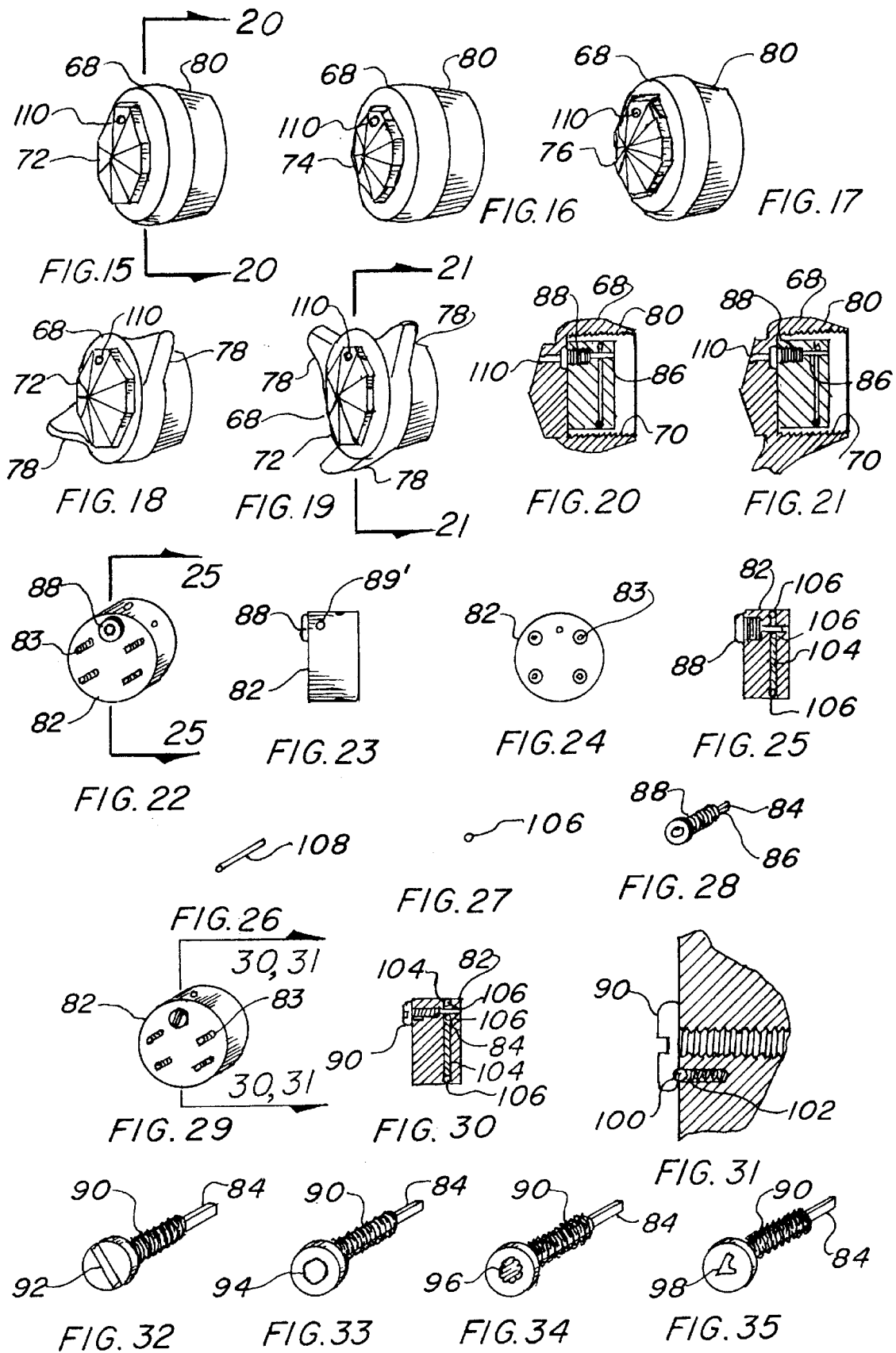

LOCKABLE AUTOMOTIVE WHEEL WITH SPLINED ADAPTER

TECHNICAL FIELD

The present invention relates to lockable automotive wheels in general. More specifically to a wheel that incorporates a splined hub adapter attached to wheel studs and a detachable and lockable spinner or hex cap for wheel securement and removal.

BACKGROUND ART

Previously many types of wheel attachments have been used in endeavoring to provide an effective means for quick removal and installation along with locks to prevent theft. In most instances prior art has concentrated on locking the lug studs by replacing the nut with a tamper proof lug nut that requires some type of key or special implement for removal. Others have utilized locked cover plates to hide the lug nuts underneath.

A search of the prior art did not disclose nay patents that read directly on the claims of the instant invention, however the following U.S. patents are considered related:

| U.S. Pat. No. | INVENTOR | ISSUED | |
|---|---|---|---|
| 4,574,602 | Mitsuru | March 11 | 1986 |
| 4,336,698 | Hurd | June 29 | 1982 |
| 3,995,461 | Hudson | December 7 | 1976 |
| 3,978,698 | Ono | September 7 | 1976 |
| 3,952,563 | Yamashita | April 27 | 1976 |

U.S. Pat. No. 4,574,602 issued to Mitsuru teaches a wheel locking device where one of the lug nuts is secured to the wheel by a lockable nut which cannot be removed without the use of a key.

Hurd in U.S. Pat. No. 4,336,698 discloses a tamper proof lug nut or bolt lock which includes a cylinder on which is rotatably mounted a sleeve with a hex for receiving a wrench and a coupling assembly disposed within the sleeve for selectively coupling and uncoupling the sleeve to the nut assembly by means of a key.

U.S. Pat. No. 3,995,461 of Hudson is for a wheel lock consisting of a cover plate which blocks access to the wheel bolts. The plate is attached by screws passing through the plate with the plate held in position by a lock passing therethrough.

Ono in U.S. Pat. No. 3,978,698 teaches a lock assembly including threads for fasting one lug on one of the plurality of wheel attaching threaded fasteners. The assembly is locked and unlocked with a key.

U.S. Pat. No. 3,952,563 issued to Yamashita is for a lock assembly for coupling a wheel to a vehicle using the vehicles studs. The assembly requires a key for access.

DISCLOSURE OF THE INVENTION

It may be plainly seen that the need for locking a wheel on a vehicle has become more critical as the industry has developed more costly and highly sought after wheels. This is particularly true with the spoked wheels that are popular at the present time and create an open invitation for theft if no preventive measure are incorporated.

The instant invention easily fulfills this needs as an adapter is employed that is attached to the vehicle with conventional lug nuts. The nuts are completely covered and hidden by a separate center hub which slips over the adapter protecting the nuts as they are completely inaccessible. The wheel is quick detachable as the adapter interfaces with the center hub and is held in place by a hub securing member in the form of a hollow hex nut or spinner that has a tapered portion mating with the hub. The hex nut or spinner is screwed onto the adapter using mating male and female threads.

A primary object of the invention is two fold, first that the hub securing member includes locking means preventing its rotation and second that a involute spline is utilized between the adapter and center hub.

An important object of the invention is the strength that is added into the assembly as prior art in this type of mounting system utilizes only gear teeth cut into the corner of the outside edge of the adapter flange and mating teeth in the integral shoulder of the center hub. While this arrangement has been acceptable in the past if the center hub becomes loose the teeth immediately disengage creating a dangerous condition with no braking control at all on the wheel. By utilizing a mating spline over a large surface this problem is completely eliminated and the ultimate structural integrity of the union is greatly enhanced and maximum security is realized.

Another object of the invention is in the strength of the locking mechanism as the invention does not rely on the soundness of the lock itself but instead on direct metal to metal interference fit. This locking means urges a pair of steel ball bearings into a groove in the adapter preventing rotation of the hex nut or spinner which is threaded onto the adapter. The strength of a steel ball bearing held in place in a mechanical groove is immense, further the hub securing member is robust and retained by threads which are inaccessible.

Still another object of the invention lies in the fact that the lock itself is completely encased within the hex nut or spinner with only a small opening for the key to be inserted. Normal burglar tools are usually large and sturdy and would not be particularly effective in prying or jimmying the lock from such a minute and remote location. The preferred locking means is a high security circular keyway tumbler type lock which precludes forcing the keyway with a screwdriver or the like providing the best security available.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment including the spokes and rim of a automotive wheel.

FIG. 2 is a cross sectional view taken along lines 2—2 of FIG. 1.

FIG. 3 is a cross sectional View taken along lines 3—3 of FIG. 1 depicting an alternate embodiment of a single integrally formed unitary wheel with internal splints within the hub portion.

FIG. 4 is a exploded View of the preferred embodiment.

FIG. 5 is a partial isometric view of a flanged hub completely removed from the invention for clarity.

FIG. 6 is a cross sectional view taken along lines 6—6 of FIG. 5.

FIG. 7 is a front view of the flanged hub completely removed from the invention for clarity.

FIG. 8 is a rear view of the flanged hub completely removed from the invention for clarity.

FIG. 9 is a right side view of the flanged hub completely removed from the invention for clarity.

FIG. 10 is a partial isometric view of the flanged hub completely removed from the invention for clarity.

FIG. 11 is a cross sectional view taken along lines 11—11 of FIG. 10.

FIG. 12 is a front view of the center hub completely removed from the invention for clarity.

FIG. 13 is a isometric view of the center hub completely removed from the invention for clarity.

FIG. 14 is a right side view of the center hub completely removed from the invention for clarity.

FIG. 15 is a partial isometric view of the hub securing member in the form of a nut with 8 sides, completely removed from the invention for clarity.

FIG. 16 is a partial isometric view of the hub securing member in the form of a nut with 10 sides, completely removed from the invention for clarity.

FIG. 17 is a partial isometric view of the hub securing member in the form of a nut with 12 sides, completely removed from the invention for clarity.

FIG. 18 is a partial isometric view of the hub securing member in the form of a spinner with 2 prongs completely removed from the invention for clarity.

FIG. 19 is a partial isometric view of the hub securing member in the form of a spinner with 3 prongs completely removed from the invention for clarity.

FIG. 20 is a cross sectional view taken along lines 20—20 of FIG. 15.

FIG. 21 is a cross sectional view taken along lines 21—21 of FIG. 19.

FIG. 22 is a partial isometric view of the latch enclosure completely removed from the invention for clarity.

FIG. 23 is a right side view of the latch enclosure completely removed from the invention for clarity.

FIG. 24 is a rear view of the latch enclosure completely removed from the invention for clarity.

FIG. 25 is a cross sectional view taken along lines 25—25 of FIG. 22.

FIG. 26 is a partial isometric view of the spacer rod completely removed from the invention for clarity.

FIG. 27 is a partial isometric view of the ball completely removed from the invention for clarity.

FIG. 28 is a partial isometric View of the keyed lock completely removed from the invention for clarity.

FIG. 29 is a partial isometric View of the latch enclosure with flat head threaded screw latch completely removed from the invention for clarity.

FIG. 30 is a cross sectional view taken along lines 30—30 of FIG. 29.

FIG. 31 is a partial cross sectional view taken along lines 31—31 of FIG. 29 enlarged to illustrate the depression on the screw head.

FIG. 32 is a partial isometric View of the flat headed threaded screw with a slotted recess in the head completely removed from the invention for clarity.

FIG. 33 is a partial isometric view of the flat headed threaded screw with a socket recess in the head completely removed from the invention for clarity.

FIG. 34 is a partial isometric view of the flat headed threaded screw with a torx type recess in the head completely removed from the invention for clarity.

FIG. 35 is a partial isometric view of the flat headed threaded screw with an Unsymmetrical shaped completely removed from the invention for clarity.

BEST MODE FOR CARRYING OUT THE INVENTION

The best mode for carrying out the invention is presented in terms of a preferred embodiment. The preferred embodiment, as shown in FIGS. 1 through 35 is comprised of the following major elements: an automotive wheel that includes an outer rim 40 and a plurality of spokes 42 both well known in the art. The invention utilizes a hollow-flanged hub adapter 44 that includes a bore with an internal radial groove 46 also a plurality of external involute radial splines 48 on the outside diameter. Further a set of male threads 50 are located on the adapter on the end opposite the flange 52. This adapter 44 is illustrated in cross section in FIG. 2 and removed from the invention in FIGS. 4–9 and includes a number of holes 54 spaced to receive lug studs from a motor vehicle to hold the adapter in place using conventional lug nuts. A female register 56 is sized to mate with the automotive brake drum to accommodate proper wheel alignment. The adapter 44 is normally machined from a ductile iron casting and may include a number of gear teeth 58 cut into the inner edge of the flange 52. Construction and machining methods are well known for this type of automotive component. This adapter 44 is mounted to the motor vehicle using the existing lug nuts as the stud holes 54 are countersunk and the entire outside of the flange 52 and nuts will be covered. In the eventuality that the vehicle utilizes lug bolts the same procedure may be used.

A hollow center hub 60 is used for spoke wheels and includes a plurality of internal involute radial splints 62 that interface with the external radial splints 48 on the adapter 44. When the center hub 60 is slipped onto the adapter 44 the splines intermesh and prevent rotation therebetween. A set of gear teeth 58a are cut into an inside surface of the hollow as shown in FIGS. 5–7 and 9 and also intermesh with the corner teeth 58 of the adapter 44. It will be noted that these teeth 58 and 58a may be omitted if desired as the splints 48 and 62 have more than enough structural integrity for the task at hand. The center hub 60 also includes an inverted cone like outwardly tapered bore 64, best illustrated in the cross section of FIG. 6, that is used to hold the hub 60 centered in place upon the adapter 44. FIGS. 5–11 illustrate the center hub 60 removed from the invention for clarity and its material and construction are basically the same as the previously described adapter 44. The center hub 60 as discussed earlier, receives the spokes 42 that attach to the outer rim 40 completing the wheel as shown in FIGS. 1 and 3 however, the invention may be utilized in solid wheels as an option. FIG. 3 illustrates such a wheel wherein the center hub is integrally formed with the rim into a single unitary wheel 66. While FIG. 3 illustrates a single embodiment other methods of construction and attachment may be used with equal ease and dispatch.

A hub securing member 68 includes external means for rotatably attaching and removing the member which may be in a number of different forms each providing a slightly different shape but sill accomplishing the same task as shown in FIGS. 15–17. The member 68 is commonly called a hex nut or spinner according to its outside configuration with its basic shape much like a cap with internal female threads 70. The member 68 incorporates external means for attachment and removal by rotation on the threads 70. These external means are illustrated in FIGS. 15–21 and vary in shape which as FIG. 15 depicts an 8 sided polygon 72, FIG.

16 a ten sided polygon 74 and FIG. 17 a twelve sided polygon 72 with each using optional multiple sides to receive a manually operated tool to install or remove the member, rotating it on the male threads 50 of the adapter 44. Each configuration requires a different tool and its physical size is non standard requiring a specially designed tool for each configuration. While the polygonal shape is less susceptible to unauthorized removal a spinner configuration may also be used to expedite installation or removal. Outwardly extending arms 78 may be employed such as shown in FIGS. 18, 19 and 21 either two arms as illustrated in FIG. 18 or three arms as depicted in FIGS. 19 and 21 with the final tightening or loosening-accomplished by striking one of the arms 78 with a blunt instrument such as a hammer or mallet.

In any event the member 68 in all of its configurations include an inward taper 80 on the outside periphery that interfaces with the outwardly tapered bore 64 of the center hub 60. The female threads 70 of the member 68 rotatably mate with the male threads 50 of the adapter 44 permitting the inward taper 80 and the outward tapered bore 64 to be tightly drawn together holding the center hub 60 onto the adapter 44 effectively attaching the wheel to the motor vehicle.

The hub securing member 68 further incorporates locking means that contiguously engage the flanged hub internal radial groove thereby presenting unauthorized removal. This locking means comprises a latch enclosure 82 fastened within the securing member 68 by a plurality of threaded fasteners 83 such as socket headed cap screws and a separate latch that includes opposed flat portions 84 on a shank 86. The latch may be either a keyed lock 88 as depicted in FIG. 28 or a flat headed screw 90 as shown in FIGS. 32–35, in both cases the shank 86 includes the flat portions 84 in similar configurations. The keyed lock 88 may be any type of tumbler lock with the high security circular keyway type being preferred. In order to hold the lock 88 in place the outside of its body may be threaded and screw into mating threads in the enclosure 82 or preferably a set screw 89 may be utilized as shown in FIG. 4 through a tapped hole 89' in line with the lock. The flat headed screw 90 may have any type of tool receiving interface within the head such as depicted in FIGS. 32–35. These tool receiving recesses includes a conventional slot 92 shown in FIG. 32, a socket head 94 illustrated in FIG. 33, a so called "TORX" head 96, as known by its tradename and depicted in FIG. 34 or a special unsymmetrical shaped recess of differing conformations exemplified in FIG. 35. In any event the flat headed screw 90 includes threads the full length right up to the head and also the pair of flat portions 84 cut into the extending end as illustrated.

In order to retain the screw 90 in the desired position the screw may have a depression 100 drilled or punched into the underside of the head, as shown in the cross section of FIG. 31. A spring loaded detent 102 is positioned within a recess 104 within the latch enclosure 82 in alignment with the depression 100 in the head such that the screw 90 is held by the urging of the spring into the desired relationship preventing unwanted rotation also orienting the screw into a locked position when fully tightened in place.

In both embodiments of the latch the flat portions 84 are provided on the extending end. In the keyed lock 88 a reduced diameter threaded shank is provided with the integral flats Provided by the manufacturer and in the screw embodiment 90, the flats 84 are machined special. In order for either embodiments of the securing member to function, a bore 104 is drilled through the enclosure 82 in alignment with the flat portions of the latch 84 and three round metallic balls 106, such as those found in a ball bearing, are positioned at the egress on each end of the bore 104 and between a spacer rod 108 which is disposed within the bore between the balls and the flat portion of the latch 84 as shown in FIGS. 4, 25 and 30. The outside balls 106 are held in place by a slight deformation of the parent metal of the enclosure 82 or peening at each open end of the bore 104. Since the latch within the enclosure 82 is oriented such that both of the balls 106 are contiguous with the flat portion 84 and the other is also touching through the spacer rod 108, when the latch is rotated by a key or special tool the flat portions 84 rotate and urge the balls outward from the enclosure 82. The flats are therefore no longer in contact with the shank forcing both of the balls 106 to protrude from the enclosure into the internal radial groove 46 of the hub adapter 44 as shown in FIGS. 2 and 3. This action prevents the hub securing member 68 from rotating on the threads 50 and 70 and removal is disallowed and since all of the mechanism is completely housed within no access is available from an outside source. It will be noted that a single ball 106 may be used eliminating the need for the spacer rod 108 and second ball, if desired.

In order to remove the wheel from a motor vehicle a key or tool is inserted into a small opening 110 in the hub securing member 68 and rotated 90 degrees permitting the balls 106 to be disengaged with the mating internal radial groove 46 in the hub adapter 44. A second tool, in the case of the polygonal shaped hub securing member 68 is placed over the flats of the polygon and rotated. A hammer or mallet is used in the case of the extending arm 78 configuration to loosen the member 68 and then rotated by hand for removal. To replace the wheel the procedure is reversed.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. A lockable automotive wheel with splined adapter comprising:

a) a hollow flanged hub adapter having a bore therein including an internal radial groove, a plurality of external involute radial splines and male threads opposite the flange, b) a hollow center hub having a plurality of internal involute radial splines therein interfacing with the hub adapter to prevent rotation therebetween and a inverted cone like outwardly tapered bore, and c) a hub securing member having external means for rotatably attaching and removing the member, an inward taper on an outside periphery interfacing with outwardly taper hub bore of the center hub, female threads within the member for rotatably mating with the flanged hub adapter permitting the inward taper of the member and the outwardly tapered bore of the center hub to be tightly drawn together holding the center hub onto the adapter and locking means contiguously engaging the flanged hub internal radial groove preventing unauthorized removal.

2. A The lockable automotive wheel as recited in claim 1 further comprising, said flanged hub adapter having a plurality of holes spaced to receive lug studs from a motor vehicle and hold the adapter in place on the vehicle by lug nuts, also a register therein sized to mate with an automotive brake drum for alignment.

3. The lockable automotive wheel as recited in claim 1 wherein said center hub further comprises attachment means for wheel spokes to attach to a wheel rim.

4. The lockable automotive wheel as recited in claim 1 wherein said center hub is integrally formed with a rim into a single unitary wheel.

5. The lockable automotive wheel as recited in claim 1 wherein said securing member external means for rotatably attaching and removing the hub further comprises a polygonal shaped raised boss having eight sides configured to receive a manually operated tool.

6. The lockable automotive wheel as recited in claim 1 wherein said securing member external means for rotatably attaching and removing the hub further comprises a polygonal shaped raised boss having ten sides configured to receive a manually operated tool.

7. The lockable automotive wheel as recited in claim 1 wherein said securing member external means for rotatably attaching and removing the hub further comprises a polygonal shaped raised boss having twelve sides configured to receive a manually operated tool.

8. The lockable automotive wheel as recited in claim 1 wherein said securing member external means for rotatably attaching and removing the hub further comprises a pair of outwardly extending arms forming a spinner capable of being rotated by striking one of the arms with a blunt instrument.

9. The lockable automotive wheel as recited in claim 1 wherein said securing member external means for rotatably attaching and removing the hub further comprises three outwardly extending arms forming a spinner capable of being rotated by striking one of the arms with a blunt instrument.

10. The lockable automotive wheel as recited in claim 1 wherein said securing member locking means further comprises a latch enclosure fastened within the securing member and a latch having opposed first and second flat portions on a shank with the latch disposed within the enclosure and a first outside ball captivated adjacent to said first flat on the shank and a spacer rod aligned with an inside ball and a second outside ball with the inside ball contiguous with the second flat such that both outside balls are urged outwardly when the latch is rotated and the flats are no longer in contact with the shank forcing both of the outside balls to protrude from the enclosure into the internal radial groove in the flanged hub preventing the securing member from being removed.

11. The lockable automotive wheel as recited in claim 10 wherein said latch further comprises a keyed lock.

12. The lockable automotive wheel as recited in claim 10 wherein said latch further comprises a flat head threaded screw with the flat portions of the shank on an end opposite the head.

13. The lockable automotive wheel as recited in claim 12 wherein said flat headed threaded screw includes a conventional tool interface in the head.

14. The lockable automotive wheel as recited in claim 12 wherein said flat headed threaded screw includes a unsymmetrical shaped recess in the head.

15. The lockable automotive wheel as recited in claim 12 wherein said screw further having a depression on an underside of the head and a spring loaded detent within the latch enclosure contiguous with the depression on the underside of the screw for retained in place preventing unwanted rotation of the screw.

* * * * *